Jan. 17, 1956 J. T. POWER 2,731,220
AIRCRAFT SEALED COCKPIT MOVABLE CANOPY MOUNTING
Filed Sept. 20, 1951 2 Sheets-Sheet 1
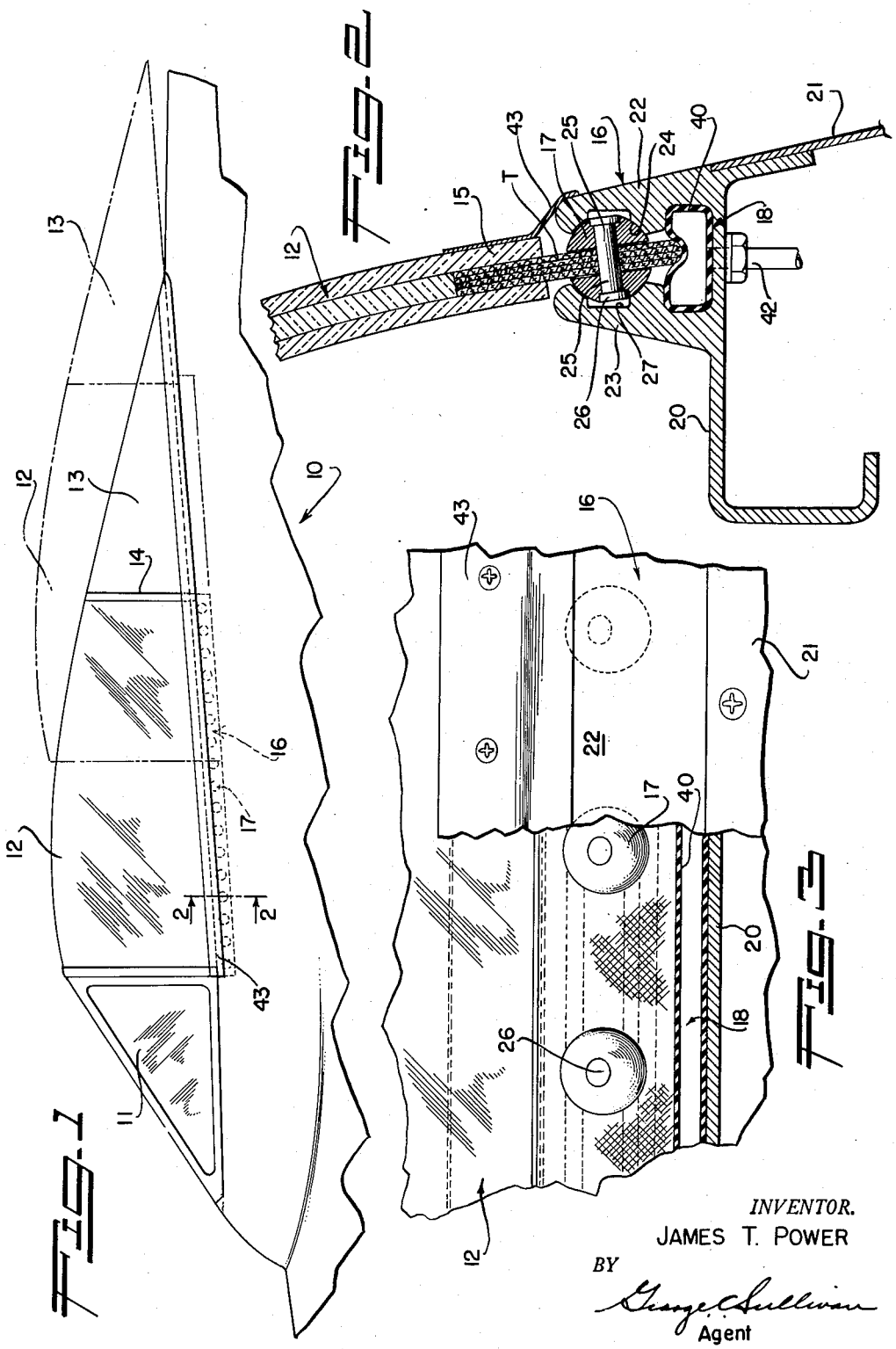
INVENTOR.
JAMES T. POWER
BY
George C. Sullivan
Agent Jan. 17, 1956 J. T. POWER 2,731,220
AIRCRAFT SEALED COCKPIT MOVABLE CANOPY MOUNTING
Filed Sept. 20, 1951 2 Sheets-Sheet 2
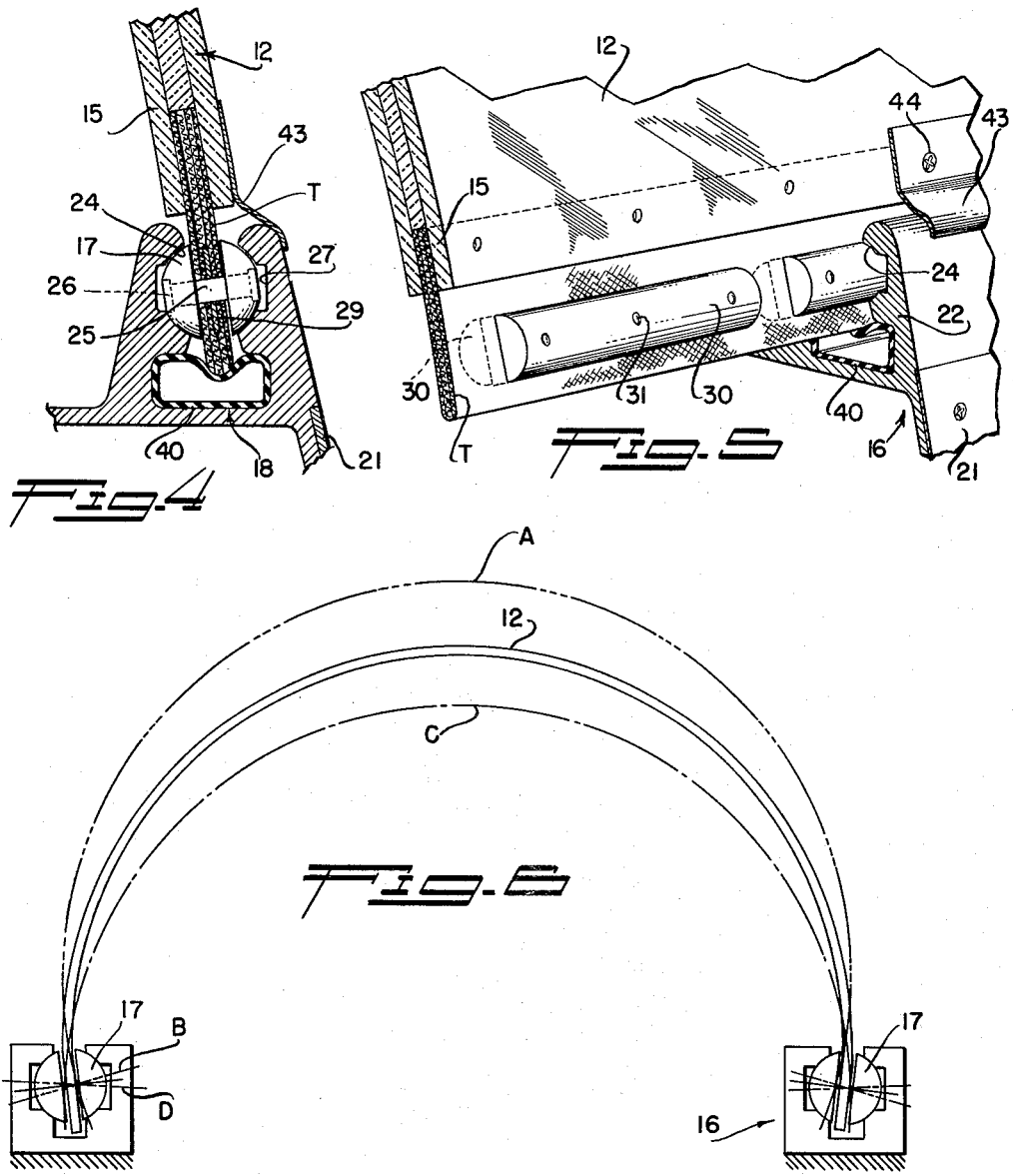
INVENTOR.
JAMES T. POWER
BY
George C. Sullivan
Agent United States Patent Office 2,731,220
Patented Jan. 17, 1956

2,731,220

AIRCRAFT SEALED COCKPIT MOVABLE CANOPY MOUNTING

James T. Power, Van Nuys, Calif., assignor to Lockheed Aircraft Corporation, Burbank, Calif.

Application September 20, 1951, Serial No. 247,393

7 Claims. (Cl. 244—121)

This invention relates to airplane cockpit enclosures or canopies, and relates more particularly to the edge attachments for such canopies, and the like.

The cockpit enclosures or canopies of airplanes are constructed of transparent plastic such as transparent acrylic plastics, and are usually movably mounted to give access to the cockpit and to be jettisonable in emergencies. The edge attachments or mountings for such caponies, in the past, have included heavy frames rigidly fixed to the edges of the plastic material canopy and cooperable with suitable track means on the fuselage. These frames, in addition to materially increasing the overall weight of the installation, add to its cost and complexity. Furthermore, the coefficient of thermal expansion and contraction of the acrylic plastic constituting the canopy proper and of the rigidly attached metal frame, are greatly different, so that severe stresses are set up in the plastic canopy when it is obliged to alter its shape, due to the wide range of temperature changes to which it is subjected. The temperature variations cause the radius of curvature of the canopy to change materially and cause the canopy to increase and decrease in length and as the canopy is rigidly fixed at its edges to the frame, constructed of a dissimilar material, these changes in shape and size induce severe stresses in the plastic canopy. The severe stresses, in turn, cause crazing of the transparent plastic, rendering the canopy unsuitable for further use.

It is an object of the present invention to provide a simple, practical and dependable edge attachment for aircraft cockpit canopies, and the like, that is cheaper and lighter in weight than the prior edge attachments, and that avoids or obviates the excessive stressing of the canopy during changes in temperature.

Another object of the invention is to provide an edge attachment for a movable and jettisonable cockpit canopy that does not necessitate the provision of a metal frame on the edge of the canopy. In accordance with the invention there is no need to rigidly secure a metal frame on the edge of the plastic canopy and, as a consequence, the weight of the installation is markedly reduced. The elimination of the usual frame also simplifies the construction and reduces the cost.

Another object of the invention is to provide an edge attachment or mounting for a movable and jettisonable canopy that permits free, unconstrained thermal expansion and contraction of the plastic canopy relative to the metal structure of the airplane as well as free fore and aft movement of the canopy to give pilot access to the cockpit and to permit jettisoning of the canopy, if necessary. The invention provides rollers or runner-like parts on the edges of the canopy, operating in tracks on the fuselage so that the plastic canopy may freely expand and contract in the fore and aft direction, relative to the metal fuselage, thus avoiding the development of stresses in the canopy and may be manually or mechanically moved fore and aft to give access to the canopy.

Another and important object of the invention is to provide a canopy edge mounting of the character mentioned that allows the canopy to expand and contract in the radial direction with changes in temperature to prevent the development of severe stresses in the canopy. The rollers or runners which movably secure the edges of the canopy to the airplane have angular movement in their respective tracks, as the radius of the canopy increases or decreases, due to thermal expansion and contraction. This rotation or angular motion of the edges of the canopy prevents the development of the severe stresses in the canopy, which have damaged the canopies attached in the conventional manner.

Another object of the invention is to provide a canopy edge attachment of this character including means for maintaining a substantially air-tight seal permitting pressurization of the cockpit.

A still further object of the invention is to provide a canopy edge attachment of the character described that does not necessitate modification or alteration of the basic canopy construction.

Other objectives and features of the invention will become apparent from the following detailed description of typical preferred embodiments throughout which reference will be made to the accompanying drawings wherein:

Figure 1 is a fragmentary side elevation illustrating a cockpit enclosure or canopy mounted on an airplane fuselage with one form of edge attachment of the invention, the broken lines illustrating the retracted or aft position of the canopy;

Figure 2 is an enlarged fragmentary vertical sectional view taken as indicated by line 2—2 on Figure 1;

Figure 3 is an enlarged fragmentary side elevation of the edge attachment means with a portion of the track broken away to illustrate the rollers and edge of the canopy in elevation;

Figure 4 is a view similar to Figure 2, illustrating an internal reinforcement for the roller mounting pin;

Figure 5 is a fragmentary perspective view with certain parts appearing in vertical cross-section and illustrating another form of the invention; and Figure 6 is a schematic or diagrammatic end view of the canopy and the edge attachments therefor with broken lines illustrating, in an exaggerated manner, the positions of the parts assumed when the canopy expands and contracts due to temperature changes.

The edge attachment or mounting means of the invention are, of course, suitable for use with cockpit canopies, windshields, and the like, of various types and constructions. In the drawings I have shown several typical forms of the invention as employed to movably secure a more or less typical cockpit canopy, it being understood that this application is not to be construed as limiting the invention.

In Figure 1, there is shown the cockpit region of an airplane fuselage 10, provided with a suitable fixed windshield 11. The cockpit enclosure or canopy 12 is shaped and proportioned to cover the cockpit, extending rearwardly from the windshield 11 when in its normal position shown in the full lines. The canopy 12 is streamlined or shaped to offer a minimum of aerodynamic drag, curving downwardly and rearwardly from the windshield 11 and being curved or arcuate in transverse cross-section, as shown in Figure 6. The longitudinal, or lower edges, of the canopy 12 are straight and parallel to conform with the upper edges of the cockpit and a fairing 13 extends aft from the canopy. The streamlined fairing 13 may or may not be transparent and is secured to the canopy 12 at a bulkhead 14. The canopy 12 is constructed of a transparent plastic, such as an acrylic plastic, and is preferably laminated, as illustrated. In accordance with the usual practice, the edges of the canopy 12 are provided with reinforcements to facilitate the attachment of the canopy. As illustrated in Figure 2, each longitudinal edge of the canopy 12, has a protruding strip or tongue T of laminated fabric or cloth. The edge strips or tongues T are cemented or laminated between the outer laminations 15 of the transparent canopy 12 and are composed of fibre-glass cloth, synthetic resin fabric, or the like, laminated with an appropriate resin to constitute very strong edge elements.

The edge attachment means of the invention, illustrated in Figures 1, 2 and 3 of the drawings, includes guides or tracks 16 on the fuselage 10 at the longitudinal edges of the cockpit, rollers or guides 17 on the canopy 12 operating in the tracks 16, and seal means 18 in the tracks for cooperating with the canopy.

The tracks 16 are provided on the fuselage 10 to extend along the fore and aft or longitudinal margins of the cockpit from the windshield 11 to adjacent the aft end of the cockpit. As best illustrated in Figure 2, each track 16 includes a channel-like base 20 which is suitably rigidly secured to the structure of the airplane. The skin 21 of the fuselage 10 may be attached to the bases 20 to extend downwardly therefrom. Spaced upstanding flanges or parts 22 and 23 are provided on the bases 20 to receive the rollers 17 of the canopy 12, as will be later described. The outer surfaces of the track parts 22 may be substantially flush with the skin 21. As illustrated, the track parts 22 and 23 may be integral with the bases 20 and each track 16 may be in the form of a one-piece extrusion, or the like, of aluminum alloy, or other suitable material, it being understood that other constructions may be employed if desired. The parts 22 and 23, which may extend for the entire length of each track 16, are spaced apart to leave channels for receiving the edge tongues T of the canopy 12 with considerable clearance, and grooves 24 are formed in the walls of these spaces to receive the rollers 17. The grooves 24 are formed in the track parts 22 and 23 to have cylindrically curved walls and the grooves of each pair of spaced track parts are directly opposite one another. The track grooves 24 are straight and parallel.

The rollers 17 are spaced along each longitudinal edge of the canopy 12 to ride or roll in the track grooves 24, just described. These rollers 17 are preferably substantially hemi-spherical parts arranged at the inner and outer sides of the canopy tongues T. While the rollers 17 may be mounted on the tongues T in any selected manner, I prefer to provide spaced pins or shafts 25 on the tongues T to rotatably carry the rollers. The shafts 25 are carried in transverse openings in the tongues T to project from the opposite faces of the tongues. It is preferred to force fit or otherwise fix the shafts 25 in their openings. The rollers 17 are rotatable on the opposite end portions of the shafts 25 and the shafts have enlargements or heads 26 at their outer ends for retaining the rollers on the pins. These heads 26 are recessed in the rollers to be substantially flush with the roller surfaces. If desired or believed necessary, the walls of the track grooves 24 may have depressions or channels 27 opposite the shaft heads 26 to avoid the possibility of any exposed edges at the shaft ends from interfering with the free movement of the rollers 17. The track grooves 24 are designed to receive the rollers 17 with suitable working clearance so that the rollers are free to move along the tracks 16 with a minimum of friction. However, as will be seen from Figure 2, the rollers 17 engaged in the grooves 24 of the track parts 22 and 23 effectively anchor or attach the canopy 12 to the fuselage 10, holding the canopy against unwanted upward, downward and lateral displacement. The pairs of rollers 17 may be equally and rather closely spaced along the edges of the canopy 12 to provide effectively distributed support for the canopy. The grooves 24 may be open at the aft ends of the tracks 17 to allow the canopy 12 to be jettisoned rearwardly from the fuselage 10 in an emergency. The broken lines in Figure 1 indicate a rearward or open position of the canopy 12 which permits the pilot to readily enter and leave the cockpit. In normal use, the canopy 12 is moved between the closed full line position of Figure 1 and the broken line position, the track and roller means 16 and 17 forming effective anti-friction supports to facilitate the movement of the canopy.

In addition to the functions of the track and roller means 16 and 17 just described, these means operate to prevent the development of stresses in the canopy 12 by reason of thermal expansion and contraction of the canopy. Upon an increase in temperature the plastic material of the canopy 12 expands to a greater extent than the metal of the fuselage 10. In considering this action it may be assumed that the canopy 12 is latched against fore and aft bodily movement in the usual manner. Upon thermal expansion of the canopy 12 the rollers 17, riding in the tracks 16, allow the canopy to move or expand fore and aft relative to the fuselage 10 so that fore and aft expansion of the canopy is unrestrained and does not set up stresses in the canopy. The thermal expansion of the canopy 12 also produces an increase in its radius of curvature. Referring to Figure 6, the full lines indicate a "normal" temperature condition of the canopy 12 and the broken line A illustrates, in an exaggerated manner, the higher temperature shape or position of the canopy. It will be seen that when the canopy 12 expands from the normal shape to a shape such as indicated by the line A, the spherical rollers 17 are free to rotate in their grooves about fore and aft axes so that the center lines of their shafts 25 may be as indicated by the lines B. This free rotation of the rollers 17 in the tracks 16 prevents excessive stresses from developing in the canopy as a result of the thermal expansion of the same. When low temperatures are encountered, the canopy 12 is free to contract to a greater extent than the fuselage 10, the rollers 17 having free movement in the tracks 16 to allow substantially unrestrained fore and aft contraction of the canopy relative to the fuselage. Here, again, this action of the rollers 17 in the tracks 16 avoids the development of stresses in the canopy that would otherwise result from the thermal contraction of the material. With the low temperature conditions the canopy 12 may shrink to a shape such as indicated by the broken line C in Figure 6, and during the contraction of the canopy to this condition, the rollers 17 are free to rotate about fore and aft axes to bring the axes of rotation of the individual rollers to positions such as indicated by the lines D in Figure 6. This free rotation of the rollers 17 prevents excessive stresses from developing in the canopy 12 by reason of the thermal contraction or shortening of its radius of curvature.

Figure 4 illustrates a slightly modified construction wherein reinforcing strips or plates 29 of metal are provided in the laminated fabric tongues T to assist in carrying the roller shafts 25. The plates 29 are preferably arranged in the tongues at the time the latter are laminated to be secured therein by the bonding resin. In this construction the shafts 25 pass through openings in the tongues T and its plates 29, the metal plates serving to assume some of the loading from the shafts, to reinforce the tongues and to stiffen the tongues at the roller shafts. There may be separate plates 29 at the several shafts 25 or each plate 29 may assist in carrying two or more shafts.

In the form of the invention illustrated in Figure 5, the rollers 17 are replaced by guides or runners 30. These runners 30 may be formed of metal, phenolic resin, phenolic resin laminate, fibre-glass fabric laminate, or the like, and are designed to engage or ride in the previously described tracks 16. Runners 30 are provided at each side of each canopy tongue T and bolts, rivets, or the like, 31, secure the runners to the tongues. The runners 30 are partially cylindrical in transverse cross-section, having flat faces for bearing on the sides of the tongues T and having curved surfaces for conforming with and riding in the track grooves 24. There are preferably pluralities of spaced runners 30 of moderate length on each side of each tongue T. The runners 30 are free to move fore and aft in the tracks 16 and to rotate in the tracks about fore and aft axes. It will be seen that the structure of Figure 5 operates in the same manner as the structure illustrated in Figures 1, 2 and 3, to permit free intentional fore and aft movement of the canopy 12 for cockpit access and jettisoning, and to relieve the canopy 12 of stresses that would otherwise develop as a result of the differentials in the thermal coefficients of expansion and contraction of the canopy 12 and fuselage 10.

The seal means 18, mentioned above, is provided to prevent the excessive leakage of air under pressure from the canopy 12 during pressurized flight of the airplane. The seal means 18 may be the same in the several forms of the invention and includes inflatable tubes 40 in the bottoms of the tracks 16. The tubes 40 are formed of rubber, or other flexible resilient material, and are inflated by air or other fluid under pressure. As illustrated, the tubes 40 may be substantially rectangular in cross section and the tracks 16 are correspondingly shaped internally and below the track grooves 24 to contain the tubes 40. The lower edges of the tongues T of the canopy 12 are engaged and sealed with by the inflated tubes 40 to minimize the escape of the cockpit pressurizing air from the canopy 12 to the atmosphere. During movement of the canopy 12 relative to the fuselage 10 as a result of temperature changes, the tongue T is free to wipe or ride along the tubes 40. Separate seal tubes 40 may be used in the tracks 16 or the tubes at the two tracks may be connected by lines or continuing tubes extending across the bulkhead 14 and/or the edge of the windshield 11 so that the system, in effect, constitutes a single continuous tube. A pressure line 42 may supply the actuating or expanding pressure to the tubes 40.

Rain seals 43 may be provided on the edge portions of the canopy 12 to lap over the tracks 16 to shed rain, snow, etc. from the tracks. The seals 43 are constructed of sheet metal, sheet plastic, or the like, and are secured to the canpoy 12 by screws 44, or the like, to yieldingly press against the outer upper corners of the tracks 16 to effectively keep moisture out of the tracks.

From the foregoing detailed description, it will be seen that I have provided simple, effective and dependable edge attachments for airplane cockpit canopies, which completely avoid the necessity for employing the heavy, expensive frames heretofore used on the canopies. The rollers 17, or the runners 30, cooperating with the tracks 16, as above described, not only serve to attach the edges of the canopy 12 to the fuselage 10, but serve to permit relative movement between the canopy and the fuselage structure to avoid the development of excessive stresses in the canopy when temperature changes result in expansion and contraction of the canopy. The avoidance of these stresses markedly reduces the tendency for the canopy to develop crazing or surface fissuring, which reduce its transparency and render it unsuited for further use.

Having described only typical forms of the invention I do not wish to be limited to the specific details herein set forth, but wish to rserve to myself any variations or modification that may appear to those skilled in the art and fall within the scope of the following claims.

I claim:

1. In an aircraft fuselage provided with a cockpit, the combination of tracks on said fuselage extending along opposite edges of said cockpit, each track comprising a wide-mouthed elongate cylindrically shaped groove, the bottom of which is recessed, a canopy for covering the cockpit including edge tongues on either side thereof projecting into their respective groove, opposed pairs of projecting guides on either side of said tongues having curved surfaces cooperating with their respective cylindrically shaped groove, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, and each tongue extending into its respective recess, the sides of said recess serving as stops for said tongue to limit the relative angular movement of said guides.

2. In an aircraft fuselage provided with a cockpit, the combination of tracks on a fuselage extending along opposite edges of said cockpit, each track comprising a wide-mouthed elongate cylindrically shaped groove, the bottom of which is recessed, a canopy for covering the cockpit including edge tongues on either side thereof projecting into their respective groove, opposed pairs of rollers on either side of said tongues having curved surfaces cooperating with their respective cylindrically shaped groove, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, and each tongue extending into its respective recess, the sides of said recess serving as stops for said tongue to limit the relative angular movement of said rollers.

3. In an aircraft fuselage provided with a cockpit, the combination of tracks on a fuselage extending along opposite edges of said cockpit, each track comprising a wide-mouthed elongate cylindrically shaped groove, the bottom of which is recessed, a canopy for covering the cockpit including edge tongues on either side thereof projecting into their respective groove, opposed pairs of projecting runners on either side of said tongues having curved surfaces cooperating with their respective cylindrically shaped groove, each one of said pairs having a single radius of curvature, the origin of which lies on the longitudinal axis of said respective cylindrically shaped groove, said radius of curvature of said pairs being equal, each of said tongues being of a width substantially less than the mouth of its respective groove, and each tongue extending into its respective recess, the sides of said recess serving as stops for said tongue to limit the relative angular movement of said runners.

4. In an aircraft fuselage provided with a cockpit, the combination of tracks on a fuselage extending along opposite edges of said cockpit, each track being in the form of a one-piece integral construction comprising a wide-mouthed elongate cylindrically shaped groove, the bottom of which is recessed, a canopy for covering the cockpit including edge tongues on either side thereof projecting into their respective groove, opposed pairs of projecting guides on either side of said tongues having curved surface cooperating with their respective cylindrically shaped grooves, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, and each tongue extending into its respective recess, the sides of said recess serving as stops for said tongue to limit the relative angular movement of said guides.

5. In an aircraft fuselage provided with a cockpit, the combination of tracks on a fuselage extending along opposite edges of said cockpit, each track comprising a wide-mouthed elongate cylindrically shaped groove, the bottom of which is recessed, a canopy for covering the cockpit including edge tongues on either side thereof projecting into their respective groove, opposed pairs of projecting guides on either side of said tongues having curved surfaces cooperating with their respective cylindrically shaped groove, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, and each tongue extending into its respective recess, the sides of said recess serving as stops for said tongue to limit the relative angular movement of said guides, and recesses on either side of said cylindrically shaped groove for reducing friction during opening and closing operations of said canopy.

6. In an aircraft fuselage provided with a pressurized cockpit, the combination of tracks on a fuselage extending along opposite edges of said cockpit, each track comprising a wide-mouthed elongate cylindrically shaped groove, the bottom of which is recessed, a canopy for covering the cockpit including edge tongues on either side thereof projecting into their respective groove, opposed pairs of projecting guides on either side of said tongues having curved surfaces cooperating with their respective cylindrically shaped groove, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, and each tongue extending into its respective recess, the sides of said recess serving as steps for said tongue to limit the relative angular movement of said guides, and an inflatable seal in each of said bottom recesses in contact with the edge of its respective tongue for minimizing leakage of air pressure in said pressurized cockpit.

7. In an aircraft fuselage provided with a cockpit, the combination of tracks on said fuselage extending along opposite edges of said cockpit, each track comprising an elongate cylindrically shaped groove having a mouth at one side of its longitudinal axis and a bottom recess at the other side of its longitudinal axis, said mouth and said recess each presenting a pair of spaced opposing surfaces, a canopy for covering said cockpit including edge tongues on either side thereof projecting into their respective groove, opposed pairs of projecting guides on either side of said tongues having curved surfaces cooperating with their respective cylindrically shaped groove, each one of said pairs having a single radius of curvature, the origin of which lies on the longitudinal axis of its respective cylindrically shaped groove, said radius of curvature of said pairs being equal, each of said tongues being of a width substantially less than the mouth of its respective groove, at least one of said pairs of surfaces serving as stops for said tongue to limit angular movement of said guides.

References Cited in the file of this patent

UNITED STATES PATENTS

| | | |
|---|---|---|
| 940,294 | Wheeler et al. | Nov. 16, 1909 |
| 940,770 | Wulff | Nov. 23, 1909 |
| 2,258,724 | Wagner et al. | Oct. 14, 1941 |
| 2,349,226 | Thomas | May 16, 1944 |
| 2,444,114 | Pevney | June 29, 1948 |
| 2,511,168 | Martin et al. | June 13, 1950 |
| 2,538,434 | Svendsen | Jan. 16, 1951 |
| 2,539,331 | Saulnier | Jan. 23, 1951 |
| 2,612,333 | Wood | Sept. 30, 1952 |

FOREIGN PATENTS

| | | |
|---|---|---|
| 558,056 | Great Britain | Dec. 17, 1943 |
| 562,844 | Great Britain | July 19, 1944 |